INVENTOR.
ALFRED A. ABRAMOSKA

Patented Feb. 7, 1950

2,496,839

UNITED STATES PATENT OFFICE 2,496,839

SOCKET JOINT

Alfred A. Abramoska, Parma, Ohio

Application January 23, 1946, Serial No. 642,867

3 Claims. (Cl. 287—90)

This invention relates to an improved socket joint suitable for use in tie rod connections for steering apparatus of automotive vehicles, although it could be adapted for other uses.

It is now a practice to employ joints in the steering apparatus of automotive vehicles each of which joints comprises a housing member and a joint stud supported in the housing in such a way that the stud may rotate and also have a swivel movement relative to the housing. The housing is generally provided with a socket formed to receive a ball or spherical portion of the stud, the stud extending into the socket through an opening in the central portion thereof. The ball or spherical portion of the stud is resiliently urged into engagement with the socket and the socket thus forms a bearing for the stud that permits free rotary and swiveling movement of the stud in the housing.

The usual type of joint is so constructed that the swivel movement of the stud causes flexing and wear of the spring mechanism which ultimately leads to the crystallization of the spring and failure thereof. Also, the usual structures employ several parts for effecting the connection between the spring and the stud, and in some cases, relatively expensive machining operations are required for this purpose.

It is an object of the present invention to provide an improved joint of the type described in which there is substantially no movement imparted to the spring during swiveling movement of the stud.

A further object of the invention is to directly connect the spring with the stud in such a manner that the joint may be assembled with a minimum of parts and with relatively simple machine and forming operations thereon.

Other objects and advantages of the invention will be apparent from the following description of a preferred form of the invention, reference being made to the attached drawings wherein—

Figure 1:
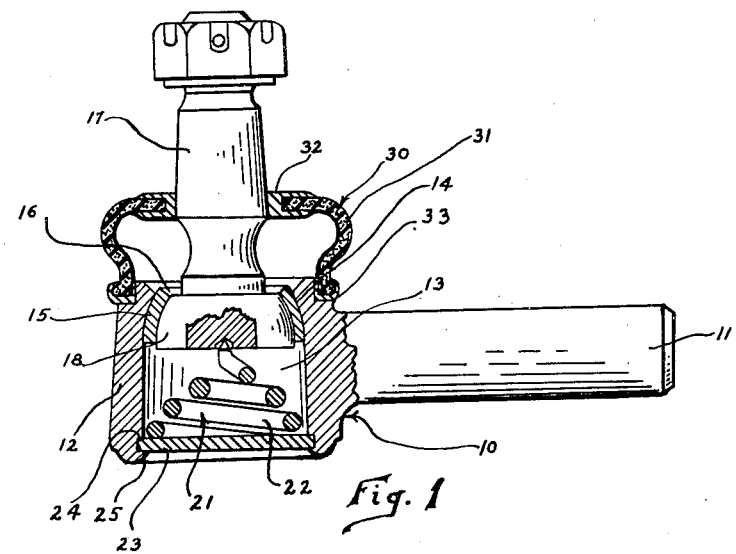
Fig. 1 is a view in section of a socket joint.
Figure 2:
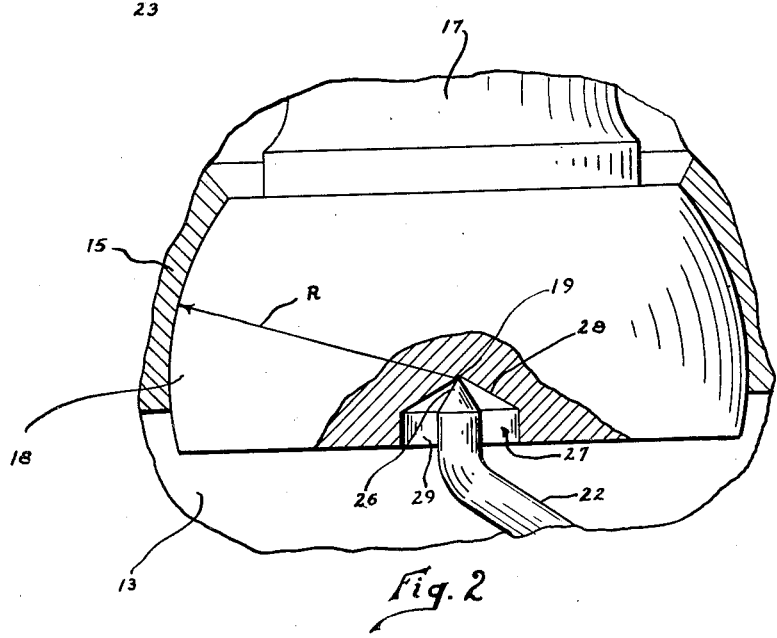
Fig. 2 is a fragmentary view of a portion of the socket shown in Fig. 1, the view being on an enlarged scale for more clearly showing certain details of the joint.

Referring to the drawings, there is shown a housing or socket member 10 which includes a shank 11, which may be threaded, if desired, and a housing 12. The housing 12 has a cylindrical bore 13 formed therein, which bore is open at the lower end, and the upper end is in the form of a section of a sphere which forms a socket 14. Preferably, a stamping 15 is provided which forms a replaceable lining for the socket 14 and it frictionally fits within the socket and forms an integral part thereof. An opening is formed in the housing at 16, which is central of the socket and the axis thereof is common to that of the bore 13 of the housing. The opening 16 flares outwardly for permitting swiveling of the stud that extends therethrough.

A stud member 17 extends through the opening 16 and the lower portion of the stud member has a section of a ball or spherical portion 18 formed at the lower end thereof, which spherical portion has its center located at 19, the radius of the section of the sphere being indicated at R. The portion 18 fits within the stamping 15, which forms the socket wall, and the socket provides a bearing surface by which the stud 17 may be rotated axially and swivelly relative to the socket.

The stud 17 is resiliently urged into bearing engagement with the socket lining 15 by a compression spring 21. The spring 21 comprises a suitable spring wire 22 wound in a spiral and conical form and the larger end of the spring is supported in the housing by a plate 23, which plate closes the lower end of the housing and is secured in place between a shoulder 24 and a turned-over rim portion 25 of the housing. The wire 22 at the opposite end of the spring is turned outwardly and it is coextensive with the axis of the spring, and the end of the wire is tapered to a point, as indicated at 26.

The pointed end of the spring 26 is received in a recess 27 formed in the lower end of the stud 17. The recess may be formed by a drill having a taper on the end thereof whereby the inner wall 28 of the recess converges to a point at 19, the center of the spherical section of the stud 17. Preferably, the point on the spring 22 and the angle of the tapering wall 28 of the recess are formed so that a 30° angle is formed between the wall 28 of the recess and the tapered end of the spring when the stud is in a position in which its axis is coextensive with the axis of the pointed end portion of the spring wire.

In the form of the invention shown, the recess 27 has cylindrical walls 29 which prevent any accidental displacement of the pointed end of the spring wire from the recess.

By causing the inner wall of the recess 28 to converge at the point 19, it will be apparent that when the stud 17 is swiveled in the socket lining 15, the point of connection between the spring 21 and the stud will be fixed relative to the housing since this point is the center about which the stud 17 rotates. It will be obvious that the swivel movement of the stud cannot impart any appreciable movement to the spring wire 22, whereby twisting, flexing or other straining and deleterious movements are precluded.

The connection between the spring 22 and the stud 17 as shown provides a minimum of friction therebetween and at the same time extra parts generally employed to form a connection between the stud and spring are eliminated. The recess 28 may be easily formed by a drilling operation so that extra stampings or precision machining heretofore employed can be eliminated.

It is to be understood that a point connection between the spring wire and the recess in the stud is not essential to the invention as any suitable bearing surfaces may be employed, such as a ball and socket type. The important features are that the connection is direct and it is effected at the center of the swivel movement of the stud.

In order to exclude grit, water and other foreign matter from the housing, there is provided a flexible seal 30 between the shaft 17 and the housing. This seal may be formed of a rubber sleeve 31 secured in a washer 32, which washer is press fitted or otherwise sealingly attached about the stud 17. The other end of the sleeve 31 is crimped in a rolled collar, which collar is suitably sealingly secured in a peripheral groove 33 formed about the upper part of the housing.

Although I have shown but one form of the invention, it is to be understood that other forms may be adopted, all falling within the scope of the claims which follow.

I claim:

1. In a socket joint, a housing including a segmental spherical seating surface forming a socket, said housing having an opening therethrough, said opening being located in the socket; a stud extending freely through said opening and into said housing, said stud having a segmental spherical portion complementary to said socket; and a coiled wire spring supported in said housing, one end portion of the wire of said spring projecting axially from the coiled spring and the end of said portion of the wire engaging said stud for resiliently urging said stud into said socket, said stud having a recess in the end thereof in the housing for receiving said end of the spring wire, the portion of the wall of said recess contacting said end of the coil spring being disposed at the center of the spherical portion of said stud whereby substantially no movement is imparted to said spring wire by swivel movement of said stud in said socket.

2. In a socket joint, a housing including a segmental spherical bearing surface forming a socket, said housing having an opening therethrough, said opening being located in the socket; a stud extending freely through said opening and into said housing, said stud having a segmental spherical portion complementary to said socket; and a coiled wire spring supported in said housing, one end portion of the wire of said spring projecting axially from the coiled spring and the end of said portion of the wire engaging said stud for resiliently urging said stud into said socket, said stud having a recess in the end thereof in the housing for receiving said end of the spring wire, the end of said spring wire being tapered to a point and the walls of said recess converging inwardly to a point, and the angle between said walls being substantially greater than the angle forming the point on said spring end, whereby said stud may be swiveled in the socket without causing further engagement between the walls of the recess and said end of the spring wire.

3. In a socket joint, a housing including a segmental spherical bearing surface forming a socket, said housing having an opening therethrough, said opening being located in the socket; a stud extending freely through said opening and into said housing, said stud having a segmental portion complementary to said socket; and a coiled wire spring supported in said housing, one end portion of the wire of said spring projecting axially from the coiled spring and the end of said portion of the wire engaging said stud for resiliently urging said stud into said socket, said stud having a recess in the end thereof in the housing for receiving said end of the spring wire, the end of said spring wire being tapered to a point and the walls of said recess converging inwardly to a point located at the center of said spherical portion of said stud, and the angle between said walls being substantially greater than the angle forming the point on said spring end, whereby said stud may be swiveled in the socket without causing further engagement between the walls of the recess and said end of the spring wire and no movement is imparted to said spring wire by such swivel movement of the stud.

ALFRED A. ABRAMOSKA.

REFERENCES CITED

The following references are of record in the file of this patent:

UNITED STATES PATENTS

| Number | Name | Date |
| --- | --- | --- |
| 1,919,797 | Maurer | July 25, 1933 |

FOREIGN PATENTS

| Number | Country | Date |
| --- | --- | --- |
| 770,914 | France | July 9, 1934 |
| 473,254 | Great Britain | Oct. 8, 1937 |